(12) United States Patent
Giles et al.

(10) Patent No.: US 8,449,771 B2
(45) Date of Patent: May 28, 2013

(54) PUMP FOR A DESALINATION SYSTEM

(76) Inventors: Philip David Giles, Glenwood (AU);
Rudolf Wilhelm Dreher, Pulau Langkakwi Kedah (MY); Katherine Margaret Dreher, legal representative, Pulau Langkakwi Kedah (MY)

(*) Notice: Subject to any disclaimer, the term of this patent is extended or adjusted under 35 U.S.C. 154(b) by 543 days.

(21) Appl. No.: 12/600,426

(22) PCT Filed: May 14, 2008

(86) PCT No.: PCT/AU2008/000675
§ 371 (c)(1),
(2), (4) Date: Aug. 20, 2010

(87) PCT Pub. No.: WO2008/141361
PCT Pub. Date: Nov. 27, 2008

(65) Prior Publication Data
US 2012/0118810 A1    May 17, 2012

(30) Foreign Application Priority Data
May 21, 2007    (AU) .................................. 2007902705

(51) Int. Cl.
*B01D 61/08*    (2006.01)
*B01D 61/06*    (2006.01)

(52) U.S. Cl.
USPC ...... 210/321.66; 210/652; 415/175; 415/191; 417/406

(58) Field of Classification Search
None
See application file for complete search history.

(56) References Cited

U.S. PATENT DOCUMENTS

| | | | |
|---|---|---|---|
| 3,396,632 A | 8/1968 | Leblanc | |
| 4,169,697 A | 10/1979 | Doundoulakis | |
| 4,257,752 A | 3/1981 | Fogarty | |
| 4,605,361 A | 8/1986 | Cordray | |
| 4,825,754 A | 5/1989 | Devaud et al. | |
| 5,701,799 A | 12/1997 | Granberg | |
| 6,491,813 B2 | 12/2002 | Verde | |
| 6,804,962 B1 | 10/2004 | Prueitt | |
| 2006/0037895 A1* | 2/2006 | Shumway | 210/137 |
| 2007/0104600 A1 | 5/2007 | Meier et al. | |

FOREIGN PATENT DOCUMENTS

| | | |
|---|---|---|
| DE | 2808769 A1 | 9/1979 |
| WO | 2005/010367 A1 | 2/2005 |

\* cited by examiner

*Primary Examiner* — Krishnan S Menon
(74) *Attorney, Agent, or Firm* — David A. Guerra

(57) ABSTRACT

A pump assembly to move water past a reverse osmosis membrane, the pump assembly having a first pump and a second pump each including a bore having a longitudinal axis and surrounding a chamber. First and second partition members extend longitudinally of the chamber. The second partition is moveable relative to the first partition member, and divides the chamber into a first sub chamber and a second sub chamber. A shaft is attached to the second member to cause angular movement thereof about the axis to change the volumes of the sub chambers. End caps are fitted to ends of each chamber to contain pressure, and ducting is provided to provide for the flow of water. The shaft of the first pump is coupled to the shaft of the second pump so that the first pump second partition angularly oscillates in phase with the second pump second partition.

18 Claims, 6 Drawing Sheets

PUMP FOR A DESALINATION SYSTEM

CROSS-REFERENCE TO RELATED APPLICATIONS

This application is an U.S. national phase application under 35 U.S.C. §371 based upon co-pending International Application No. PCT/AU2008/000675 filed on May 14, 2008. Additionally, this U.S. national phase application claims the benefit of priority of co-pending International Application No. PCT/AU2008/000675 filed on May 14, 2008 and Australia Application No. 2007902705 filed on May 21, 2007. The entire disclosures of the prior applications are incorporated herein by reference. The international application was published on Nov. 27, 2008 under Publication No. WO 2008/141361.

TECHNICAL FIELD

The invention relates to reverse osmosis systems and, more particularly, provides a novel device to reduce the energy requirement in comparison to conventional reverse osmosis methods.

BACKGROUND OF THE INVENTION

Reverse osmosis is a phenomenon that was first considered in the 1950's as a method for separating the components of a solution. Since that time the process has been highly developed and refined and is now one of the primary methods of producing desalinated water from saline water.

In the reverse osmosis process the solution to be separated is passed under high pressure past a reverse osmosis membrane enclosed within a higher pressure chamber. The reverse osmosis membrane allows a certain percentage of the solution to pass through the membrane as potable water, while rejecting the various impurities within the water, including salt.

Although reverse osmosis can be used for many sorts of separation it is most commonly used for desalination of salt or brackish water, especially sea water. Accordingly, for convenience, throughout this specification the feed stock or saline water to be desalinated will be described generally as "feed water" the desalinated water produced as "product water" and the feed water which has had the product water extracted from it, as "brine" and reverse osmosis as "RO".

In a conventional RO system, from 10% to 40% of the feed water is recovered as potable water, but regardless of the recovery rate, 100% of the feed water passing through the system must be brought to operating pressure by the high pressure pump. To bring the feed water to the necessary pressures required for the RO operation, conventional systems require significant amounts of energy. Various ways have been explored to reduce the energy required.

Among the ways that have been tried are energy recovery methods but if energy is being recovered, then more energy than needed is being supplied. Furthermore, these methods are unable to recover all the energy being lost by conventional methods.

Disclosed in U.S. Pat. No. 5,462,414 is a pump employed in reverse osmosis systems. The pump is a dual chamber pump, each chamber having a piston with the pistons linearly reciprocated alternatively pumping feed water towards the reverse osmosis membrane of the desalination system.

The ram and piston assembly is caused to move by the supply of feed water to one end of the hydraulic unit. The forward movement of the ram at this end causes the ram and piston at the other end to move at the time and at the same rate. Feed water at this end is contained within a closed loop either side of the piston, said closed loop also includes a RO membrane.

As the piston moves feed water is driven from one side of the piston to the other via the RO membrane. As the feed water enters the side of the piston containing the ram, the pressure of the water is intensified by the volume of the ram. This intensified pressure of the feed water causes the RO process to take place.

This device is far superior to those that had preceded it but still has drawbacks in that it has a large number of parts and a fixed recovery rate, making it unfit to alter the volume recovery rate. It is also unsuitable to be retro fitted to existing systems.

Disclosed in U.S. Pat. No. 6,491,813 are two pumps similar to that as described in U.S. Pat. No. 5,462,414. The first solution offered in this patent, is the same as the above. The second solution provides for pressure intensification by the use of a high pressure pump. This system still has its drawbacks due to a large number of parts and the use of non return valves.

OBJECT OF THE INVENTION

It is the object of the present invention to overcome or substantially ameliorate at least one of the above disadvantages.

SUMMARY OF THE INVENTION

There is disclosed herein a pump assembly to move water past a reverse osmosis membrane, said pump assembly having a first pump and a second pump, each pump including:

a bore having a longitudinal axis and surrounding a chamber;

a first partition member extending longitudinally of the chamber;

a second partition member also extending longitudinally of the chamber and moveable relative to the first partition member, and dividing said chamber into a first sub chamber and a second sub chamber;

a shaft attached to said second member to cause angular movement thereof about said axis to change the volumes of said first and second sub chambers; and ducting communicating with said first and second sub chambers to provide for the flow of water with respect thereto as the volumes are varied; and wherein the shaft of said first pump is coupled to the shaft of said second pump so that the first pump second partition angularly oscillates in phase with the second pump second partition.

There is further disclosed herein, the above pump assembly in combination with a reverse osmosis membrane, with the pump assembly being employed to pass feed water past the membrane to desalinate the water.

Preferably, said membrane is part of a reverse osmosis assembly having a feed water inlet, with each pump being operable to deliver feed water to said inlet, and said combination includes a further pump to deliver feed water to said feed water inlet.

Preferably, said assembly includes an outer housing within which the first and is second pumps are located with said outer housing being provided to be internally pressurised.

BRIEF DESCRIPTION OF THE DRAWINGS

Preferred forms of the present invention will now be described by way of example with reference to the accompanying drawings wherein.

DETAILED DESCRIPTION OF THE PREFERRED EMBODIMENTS

Figure 1:
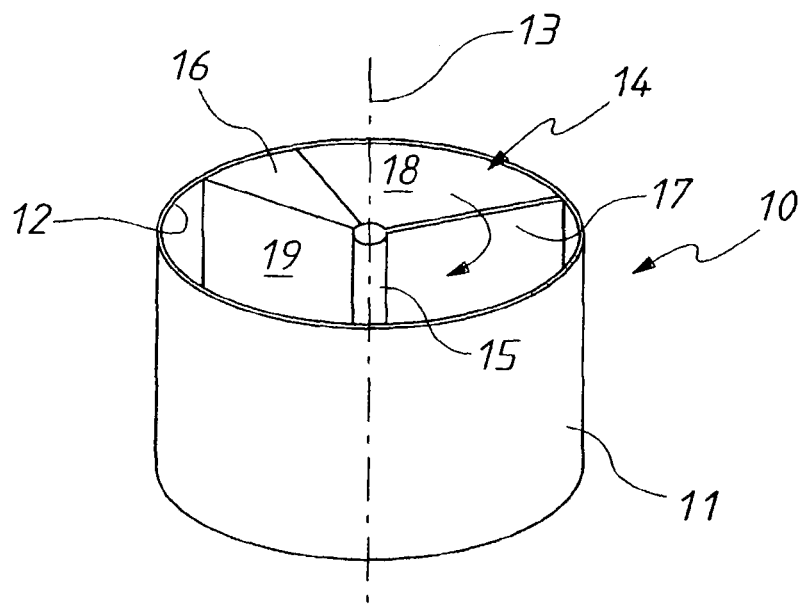
FIG. 1 is a schematic isometric view of one of the cylinders, excluding end caps, in the pump system to be used with a reverse osmosis membrane.
Figure 2:
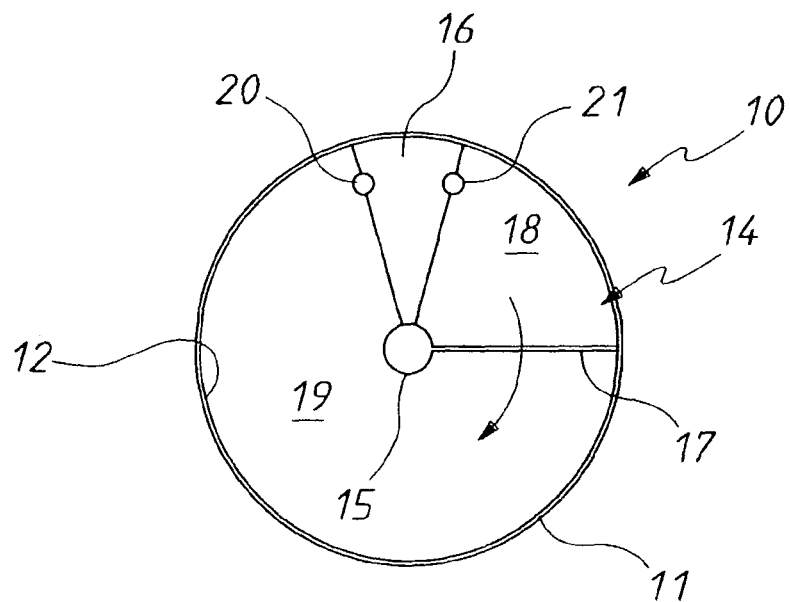
FIG. 2 is a schematic top plan view of the pump of FIG. 1.

In FIGS. 1 and 2 of the accompanying drawings there is schematically depicted a pump 10 to be used in a reverse osmosis membrane system, and more particularly but not exclusively to a system when used to produce desalinated water.

The pump 10 has a cylinder 11 having an internal generally cylindrical bore 12 surrounding a chamber 14. The chamber 14 has a longitudinal axis 13.

Mounted so as to extend longitudinally of the axis 13 is a shaft 15, while fixed to the cylinder 11 and extending to the shaft 15 is a first partition member 16. In this embodiment the partition member 16 is fixed so as to be stationary relative to the cylinder 11.

Fixed to the shaft 15 is a second partition member 17 that divides the chamber 14 into a first sub chamber 18 and a second sub chamber 19, with the volumes of the sub chambers 18 and 19 being varied by angular movement of the member 17 about the axis 18.

Operatively associated with the sub chamber 19 is a duct 20 that provides for the flow of water to and from the sub chamber 19. Operatively associated with the sub chamber 18 is a duct 21 that provides for the flow of water with respect to the sub chamber 18.

Figure 3:
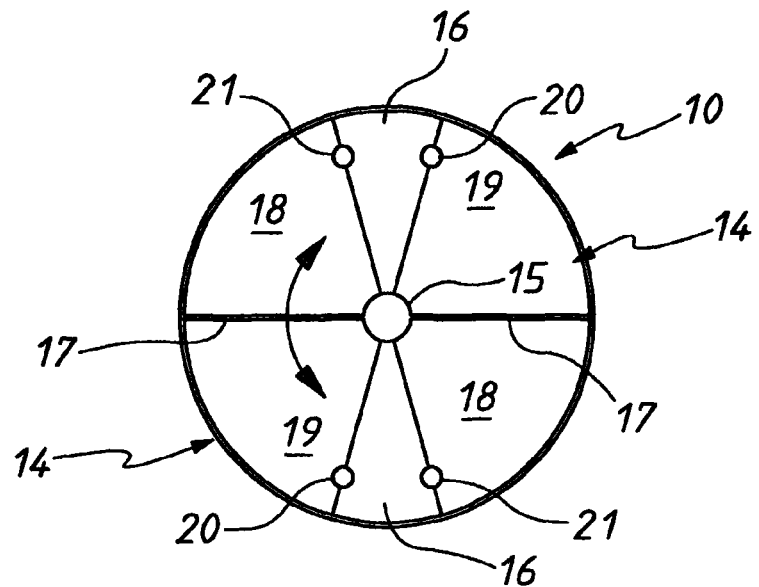
FIG. 3 is a schematic top plan view of a modification of the pump of FIG. 1.

FIG. 3 illustrates a pump 10 that is a modification of the pump of FIGS. 1 and 2. In this embodiment there are two "fixed" first partition members 16, and two "movable" second partition members 17 that are angularly oscillated in unison about the longitudinal axis 13 by the angular movement of the shaft 15. Accordingly there are two sub chambers 18 and two sub chambers 19, and two chambers 14. Other variations of the design are to divide the one cylinder into four or more equal number of compartments with corresponding changes in the number of partition members 17.

Figure 4:
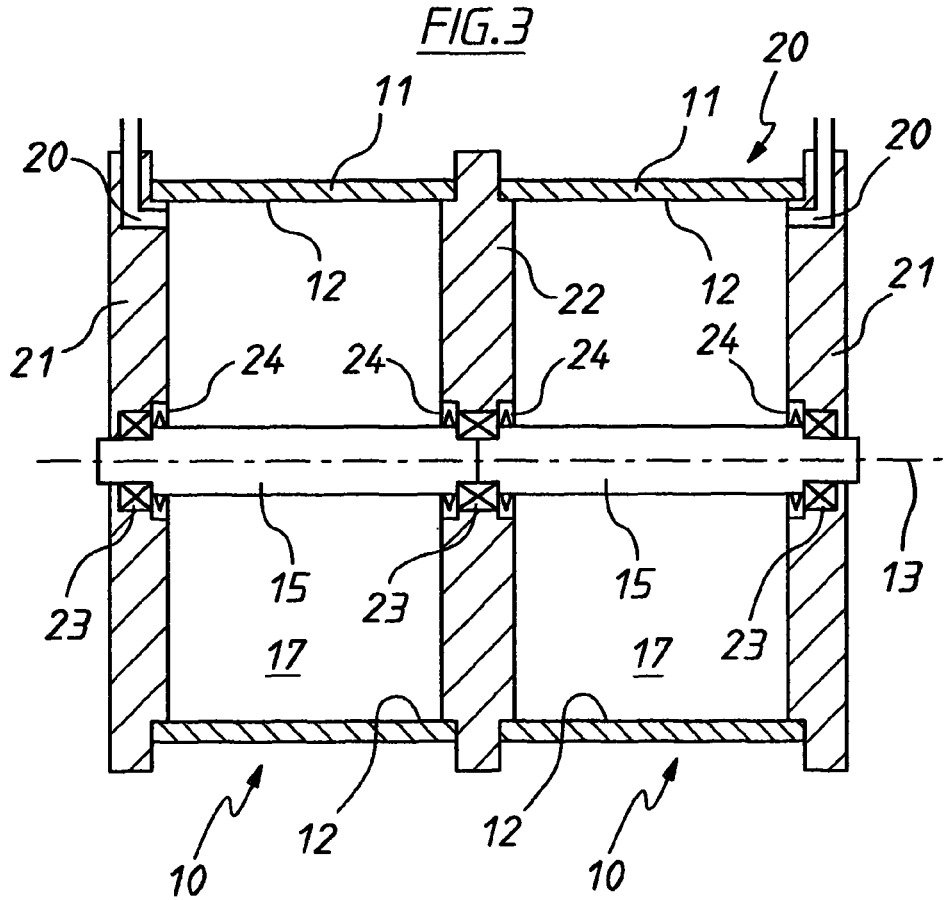
FIG. 4 is a schematic sectioned side elevation of a still further pump.

Typically the pump 10 in FIGS. 1 and 2 would be part of a pump assembly 20 (FIG. 4), the assembly 20 consisting of two pumps 10, with the two shafts 15 linked so as to rotate in unison.

The chambers 14 are sealed at their ends by end caps 21 and a central cap 22 within which bearings 23 are mounted to support the shafts 15 for angular movement about the longitudinal axis 13. Seals 24 are also provided.

Figure 5:
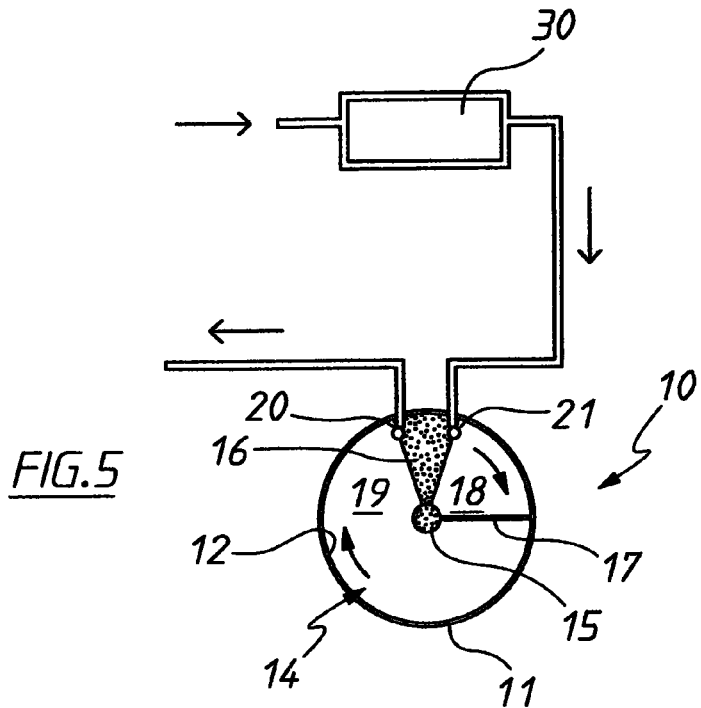
FIG. 5 is a schematic diagram illustrating a drive system for a reverse osmosis system.

In use of the above described pump 10, the pump 10 would be coupled to a low pressure feed pump 30 (FIG. 5) (by valve not illustrated) so that feed water at low pressure was delivered to the sub chamber 18 via duct 21. For example, when water at low pressure is delivered to the sub chamber 18, rotation of partition member 17 occurs and brine in the sub chamber 19 is delivered to the outlet duct 20 and thus to waste.

Figure 6:
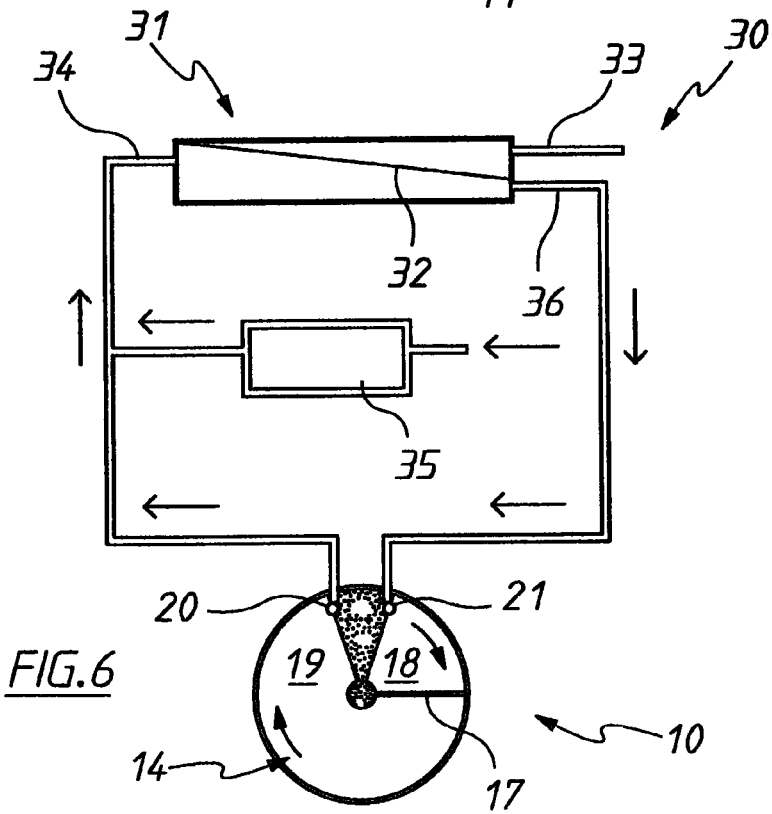
FIG. 6 is a schematic diagram illustrating a closed loop drive system for a reverse osmosis system.

In FIG. 6 there is schematically depicted a desalination system 30. The system 30 employs the pump 10 as well as a reverse osmosis membrane assembly 31 employing a membrane 32 that provides for the delivery of product water to an outlet 33. The assembly 31 has an inlet 34 to which feed water is delivered under pressure due to operation of the pump 35.

The high pressure pump 35 receives a supply of feed saline water and delivers it to the pump 10 and therefore membrane 31.

The pump 10 is connected to the inlet 34, as well as an outlet 36 from which the pump 10 receives water having passed the membrane 32. In this present example, as the volume of the sub chamber 19 decreases, the volume of the sub chamber 18 increases by the same amount. As the pump 35 is a high pressure pump, it delivers extra supply of feed water at the pressure necessary for the reverse osmosis process to occur. This additional pressure is delivered to the closed loop of the assembly 31 that incorporates the pump 10. The water delivered to the loop is equivalent to the volume of product water forced through the membrane 32 and delivered to the outlet 33. The volume of water delivered to sub chamber 18 is the same as the volume delivered from the sub chamber 19.

Figure 7:
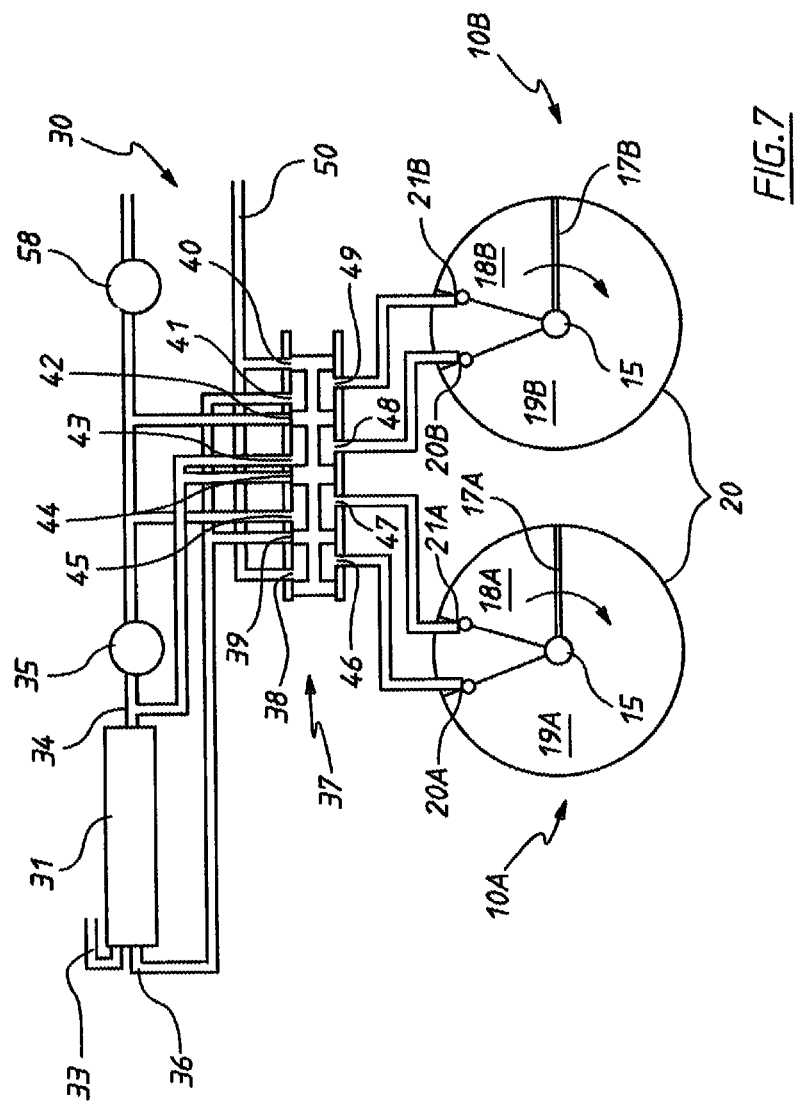
FIG. 7 is a schematic diagram of a reverse osmosis system during a first cycle.
Figure 8:
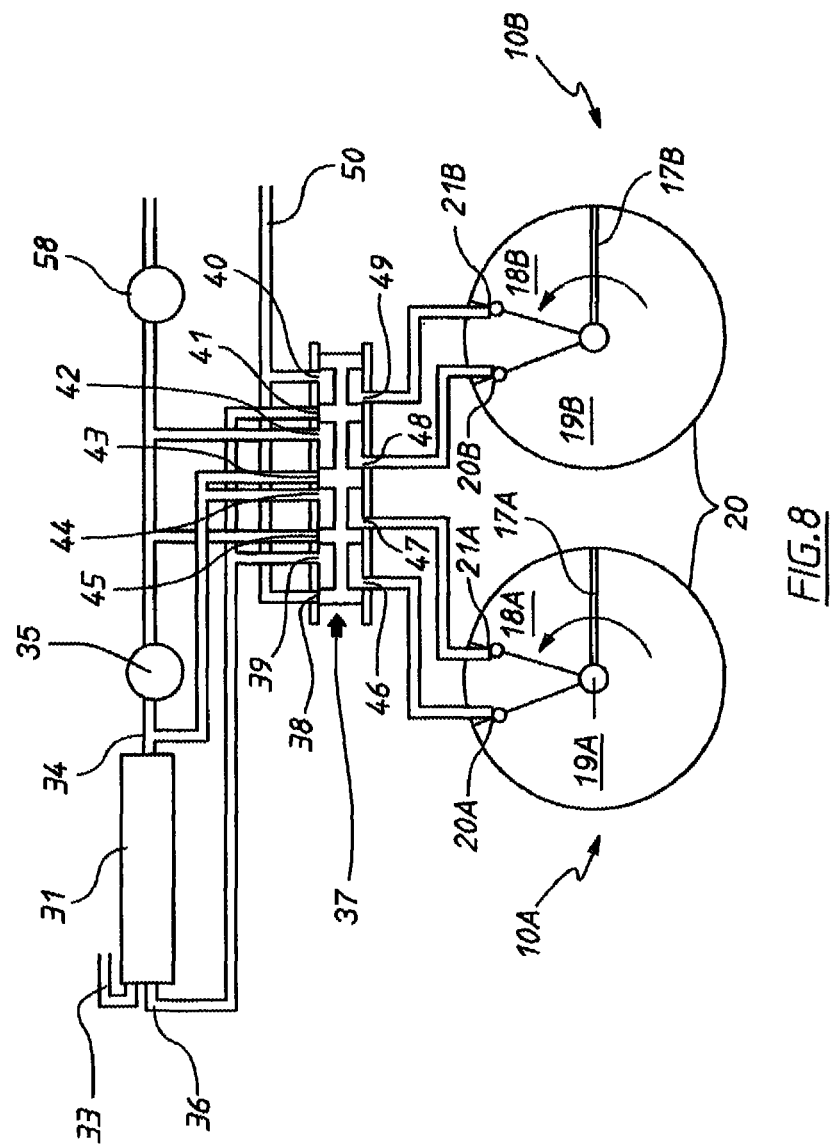
FIG. 8 is a schematic diagram of the system of FIG. 7 during a second cycle.

In FIGS. 7 and 8, there is depicted the full desalination system 30. In this example, two pumps 10 are labelled pump 10A and pump 10B.

System 30 includes a further pump 58 that delivers low pressure feed water to the pumps 10A and 10B, as well as the pump 35 that delivers feed water at high pressure to the assembly 31.

The pumps 10A and 10B are interconnected via conduits to the pumps 35 and 58 as well as the assembly 31 by means of a spool valve 37 to form a full desalination system. The spool valve 37 in particular coordinates operation of the pumps 10A and 10B. In that regard reference is made to FIG. 4 where the pump assembly 20 is more fully depicted, with the shafts 15 coupled so as to be driven in unison. Accordingly in FIGS. 7 and 8 the movable partition members 17A and 17B angularly oscillate in unison. The members 17A and 17B have the same swept volumes.

In FIG. 7, the spool valve 37 is configured so that feed water at low pressure is delivered from the pump 58 to the ports 45 and therefore port 47 to the duct 21A so that feed water at low pressure is delivered to the sub chamber 18A to drive the member 17A. Accordingly brine in the sub chamber 19A is delivered to the port 46, then port 38 for delivery to the outlet (drain) 50. As the feed water under low pressure being delivered to the sub chamber 18a drives the member 17A, the member 17B is accordingly driven. Thus the volume of the sub chamber 19B is decreased and the volume of the sub chamber 18B increased. Feed water in the sub chamber 19B is delivered to the inlet 34 via the ports 20B, 48 and 43. During this cycle, feed water supplied by the further pump 58 is delivered to the high pressure pump 35, which in turn delivers a volume of high pressure feed water into the closed loop of pump 10B and assembly 31. Product water (desalinated water) of the same volume as supplied by pump 35 is delivered to the outlet 33, with the remaining water (brine) exiting from the outlet 36 and being delivered to the sub chamber 18B via ports 41, 49 and 21B.

In FIG. 8 the spool valve 37 is configured so that the pump 58 is connected to the ports 42 and 48 so that feed water is delivered to the sub chamber 19B via port 20B. Accordingly the partition member 17B is angularly driven to reduce the volume of the sub chamber 18B and the brine in this chamber from the previous cycle is sent to drain 50 via ports 21B, 49 and 40. The partition member 17A is driven by the rotation of 17B to reduce the volume of the sub chamber 18A so that feed water is delivered to the inlet 34 via ports 21A, 47 and 44. At the same time feed water supplied by pump 58 is delivered to high pressure pump 35, which in turn delivers a volume of high pressure feed water into the closed loop of pump 10A and assembly 31. Product water of the same volume as supplied by pump 35 is delivered to outlet 33. With the remaining water (brine) exiting from the outlet 36 and being delivered to the sub chamber 19A via ports 39, 46 and 20A.

Accordingly by moving the spool valve 37 cyclically between the configurations of FIGS. 7 and 8, the system 30 operates to provide desalinated product water at the outlet 33.

Figure 9:
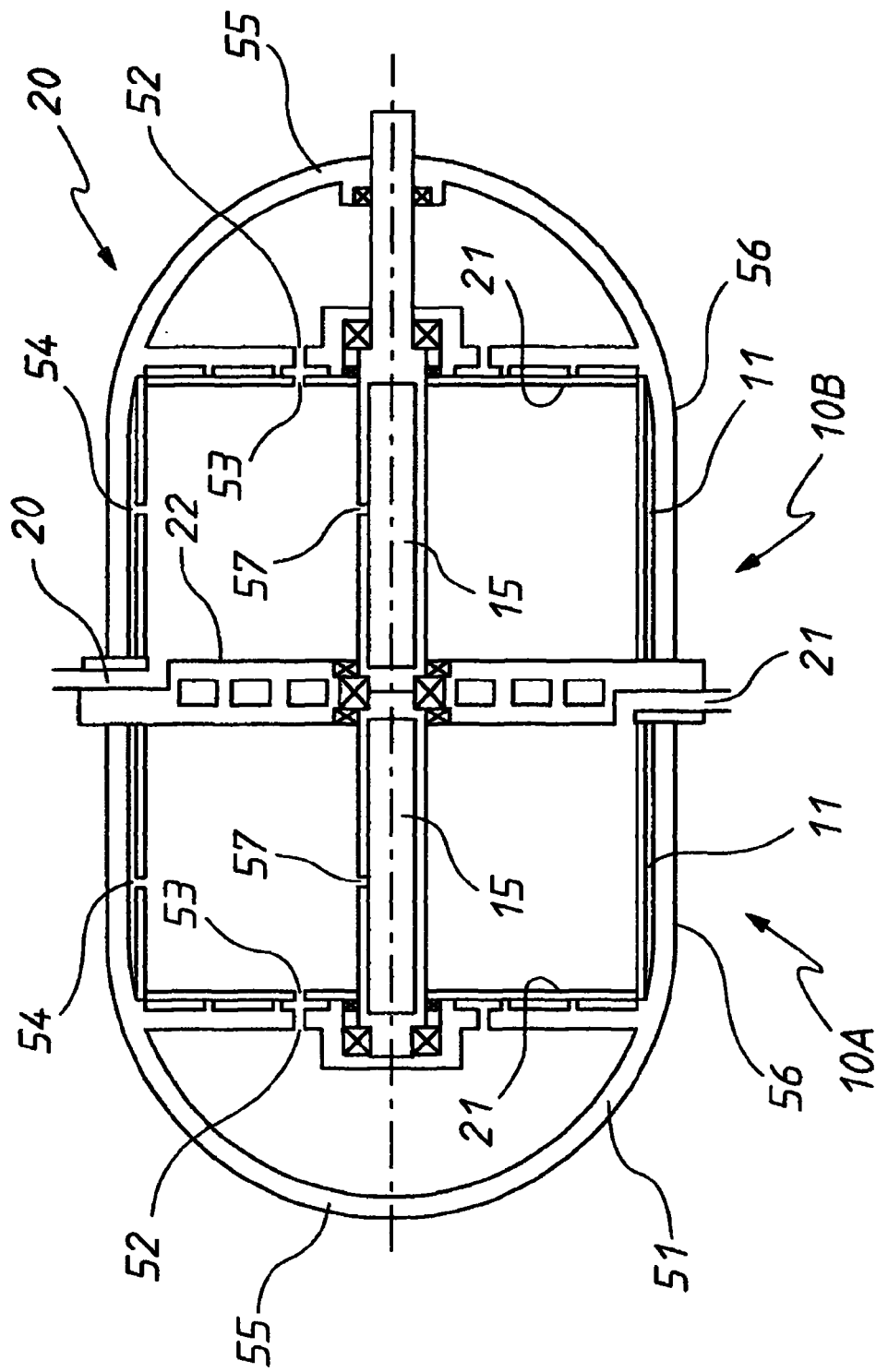
FIG. 9 is a schematic modification of the pump of FIG. 4.

In FIG. 9 there is schematically depicted a modification of the pump 20. In this embodiment the pumps 10A and 10B are encapsulated in a sealed outer housing 51. In this embodiment, the outer housing 51 provides the "pressure vessel" with passages 52, 53 and 54 providing for a balance of pressure in the voids between the outside surfaces of pumps 10A and 10B and the pressure vessel 51, thereby transferring the major pressure containment to the outer housing 51. More particularly the outer housing 51 has end "dome" portions 55 joined by a cylindrical sleeve 56. Additionally, shafts 15 of pumps 10A and 10B are hollow and are provided with passages 57 to provide for a balance of pressure. The above construction enables metal thicknesses employed in the cylinders 11 and end walls 21 to be reduced and for the shafts 15 to be of a lighter construction.

The above described preferred embodiments provide a number of advantages.

Substantially less energy is required to operate the system by comparison with conventional systems.

The device is simple and has a small number of parts.

The system is very versatile and adaptable by comparison to a system with a fixed recovery/volume ratio. In addition, all conventional systems can easily be adapted to the device by simply down sizing the output of the high pressure pump. All other components i.e. the pre-filter system, the membrane, booster pump and control circuit are unaffected by the addition of the device.

The output of the high pressure pump 35 can be precisely metered to match the production capacity of the membrane/s, the output can be precisely controlled and over production, which is detrimental to the membranes, is avoided. As a consequence no pressure regulating valve is needed, as is the case in conventional systems.

Another consideration is the adaptability of the pump 10. By controlling the number of oscillations per minute of the partition members 17 with a speed control metering valve or by selection of pump capacity, one size device can be used for a number of different RO system sizes. Additionally by being able to independently control the volume of water supplied by the low pressure pump 58 and also the high pressure pump 35.

Since the recovery/volume ratio can be varied, the device, in addition to RO sea water desalination can also be used in brackish water, nanofiltration and ultrafiltration systems. All systems will benefit from considerable power savings.

The invention claimed is:

1. A reverse osmosis system to treat water, said reverse osmosis system comprising:
a reverse osmosis assembly having a reverse osmosis membrane to which water is delivered, an inlet via which feed water is delivered to the assembly, a first outlet to which product water is delivered, and a second outlet to which water that has passed said reverse osmosis membrane is delivered; and
a pump assembly operatively associated with said reverse osmosis assembly to deliver the feed water thereto and to receive the water from said second outlet, said pump assembly having a first pump and a second pump, each of said pumps comprising:
a bore having a longitudinal axis and surrounding a chamber;
a first partition member extending longitudinally of said chamber;
a second partition member also extending longitudinally of said chamber and moveable relative to said first partition member, and dividing said chamber into a first sub chamber and a second sub chamber;
a shaft attached to said second member to cause angular movement thereof about said longitudinal axis to change the volumes of said first and second sub chambers;
ducting communicating with said first and second sub chambers to provide for the flow of water with respect thereto as the volumes are varied;
a valve connected to said reverse osmosis assembly and said pump assembly to provide for a flow of water therebetween;
a feed water pump to deliver said feed water at a desired pressure and volume into a closed loop of said first and second pumps and said reverse osmosis assembly; and
a further feed water pump to deliver said feed water at a desired pressure to said inlet of said reverse osmosis assembly, as well as said feed water pump;
wherein said shaft of said first pump is coupled to said shaft of said second pump so that said second partition member of said first pump angularly oscillates in phase with said second partition member of said second pump.

2. The reverse osmosis system according to claim 1, wherein said first and second pumps each having ends that are sealed by end caps and a common central cap, and wherein a bearing is mountable to said end and central caps to support said shaft for angular movement about said longitudinal axis respectively.

3. The reverse osmosis system according to claim 2, wherein said valve connects said inlet and second outlet of said reverse osmosis assembly to said pump assembly, with said first sub chamber of said first pump and said second sub chamber of said second pump being alternately connected to said inlet and said further feed water pump, and said second sub chamber of said first pump and said first sub chamber of said second pump being alternately connected to said second outlet and a drain.

4. The reverse osmosis system according to claim 3, wherein said pump assembly further comprising at least one bearing fitted to support said shaft for angular movement about said longitudinal axis respectively.

5. The reverse osmosis system according to claim 1, wherein said valve is a spool valve.

6. The reverse osmosis system according to claim 1, wherein said shaft of said first pump and said shaft of said second pump are a common shaft.

7. The reverse osmosis system according to claim 1, wherein said first and second partition members each sweeps a predetermined volume, with the volumes being the same.

8. The reverse osmosis system according to claim 1, wherein said pump assembly further comprising an outer housing within which said first and second pumps are located, wherein said outer housing being provided to be internally pressurized.

9. A reverse osmosis system comprising:

a reverse osmosis assembly having a reverse osmosis membrane to which water under pressure is delivered, an inlet via which feed water under pressure is delivered to the assembly, a first outlet to which product water is delivered, and a second outlet to which water that has passed said reverse osmosis membrane is delivered; and a pump assembly operatively associated with said reverse osmosis assembly to deliver the feed water thereto and to receive the water from said second outlet, said pump assembly having a first pump and a second pump, each of said pumps comprising:

a bore having a longitudinal axis and surrounding a chamber;

a first partition member extending longitudinally of said chamber;

a second partition member also extending longitudinally of said chamber and moveable relative to said first partition member, and dividing said chamber into a first sub chamber and a second sub chamber;

a shaft attached to said second member to cause angular movement thereof about said longitudinal axis to change the volumes of said first and second sub chambers; and ducting communicating with said first and second sub chambers to provide for the flow of water with respect thereto as the volumes are varied;

wherein said shaft of said first pump is coupled to said shaft of said second pump so that said second partition member of said first pump angularly oscillates in phase with said second partition member of said second pump;

a valve connected to said reverse osmosis assembly and said pump assembly to provide for the flow of water therebetween;

a feed water pressure pump to deliver feed water at a desired pressure to said inlet of said reverse osmosis assembly; and a further feed water pump, said further feed water pump delivering feed water to said feed water pressure pump and said pump assembly to provide for the delivery of feed water to said first sub chamber of said first pump and said second sub chamber of said second pump;

wherein said valve connects said inlet and second outlet of said reverse osmosis assembly to said pump assembly, with said first sub chamber of said first pump and said second sub chamber of said second pump being alternately connected to said inlet and said further feed water pump, and said second sub chamber of said first pump and said first sub chamber of said second pump being alternately connected to said second outlet and a drain.

10. The reverse osmosis system according to claim 9, wherein said valve is a spool valve.

11. The reverse osmosis system according to claim 9, wherein said shaft of said first pump and said shaft of said second pump are a common shaft.

12. The reverse osmosis system according to claim 9, wherein said first and second partition members each sweeps a predetermined volume, with the volumes being the same.

13. The reverse osmosis system according to claim 9, wherein said first and second pumps each having ends that are sealed by end caps and a common central cap, and wherein a bearing is mountable to said end and central caps to support said shaft for angular movement about said longitudinal axis respectively.

14. The reverse osmosis system according to claim 9, wherein said pump assembly further comprising an outer housing within which said first and second pumps are located, wherein said outer housing being provided to be internally pressurized.

15. The reverse osmosis system according to claim 14, wherein said outer housing is a pressure vessel with passages providing for a balance of pressure in voids between an outside surface of said first and second pumps and said outer housing.

16. The reverse osmosis system according to claim 15, wherein said shafts of said first and second pumps each being hollow and defining a passage for balancing pressure.

17. The reverse osmosis system according to claim 8, wherein said outer housing is a pressure vessel with passages providing for a balance of pressure in voids between an outside surface of said first and second pumps and said outer housing.

18. The reverse osmosis system according to claim 17, wherein said shafts of said first and second pumps each being hollow and defining said passages for balancing said pressure.

* * * * *